United States Patent [19]

Kessmar

[11] 4,266,438

[45] May 12, 1981

[54] TRANSMISSION SHIFT CONTROL

[75] Inventor: Leo R. Kessmar, Northwood, Ohio

[73] Assignee: Dana Corporation, Toledo, Ohio

[21] Appl. No.: 58,068

[22] Filed: Jul. 16, 1979

[51] Int. Cl.³ ............................................. G05G 9/18
[52] U.S. Cl. .................................... 74/473 R; 74/526
[58] Field of Search .......... 74/473 R, 473 P, 473 SW, 74/475, 476, 477, 526

[56] References Cited

U.S. PATENT DOCUMENTS

| | | | |
|---|---|---|---|
| 1,330,912 | 2/1920 | Short | 74/473 P |
| 2,015,736 | 10/1935 | Vandervoort | 74/473 R X |
| 2,694,943 | 11/1954 | Brumbaugh | 74/473 R |
| 4,104,929 | 8/1978 | Kessmar | 74/473 R |

*Primary Examiner*—Allan D. Herrmann
*Attorney, Agent, or Firm*—Charles R. Schaub

[57] ABSTRACT

A shift mechanism for the gears of a transmission is disclosed having a pivotally mounted bushing assembly. The bushing assembly defines an aperture. Positioned in adjacent, spaced apart relationship to the bushing assembly is means for selectively engaging one of a plurality of gears in a transmission. A shift lever is rotatably positioned in the aperture in the bushing assembly. One end of the shift lever is adapted for drivingly engaging the means for selectively engaging one of a plurality of gears in a transmission, whereby rotating the shift lever selects the gear in the transmission and pivoting the shift lever engages the selected gear in the transmission.

14 Claims, 8 Drawing Figures

TRANSMISSION SHIFT CONTROL

BACKGROUND OF THE INVENTION

The present invention relates generally to multi-speed transmissions and more particularly to shift mechanisms for selectively engaging gears of such transmissions.

The development of manual shift multi-speed transmissions has created the problem of providing a shift mechanism which is capable of effecting all of the required transmission gear shifts while maintaining a relatively simple shift pattern. Shift mechanisms generally include a pivotal shift lever and may include a series of linkages operatively connected with the shift lever and adapted to engage and disengage gears of an associated transmission.

Conventional multi-speed transmissions utilize shift forks to axially drive gears into engagement, with each shift fork capable of engaging two gears. A plurality of shift forks is therefore required in a transmission having more than two speeds. Each shift fork is affixed to an axially slideable shift rod, with all of the shift rods of the transmission being adjacent and parallel. Most shift forks have a lug for driving engagement with the shifting mechanism. When all gears are in a neutral position, the lugs of each shift fork are generally laterally aligned with each other. The shifting mechanism must be capable of selectively engaging each of the shift fork lugs to drive each shift fork.

In some vehicles the driver's or operator's compartment is crowded and the need for a simple shift pattern becomes more pronounced. For example, in many heavy duty trucks the driver's compartment is located directly over the engine, with the engine projecting upward above the floor level of the compartment. The portion of the engine which projects into the driver's compartment is enclosed by a heat and sound insulating cover located between the driver and passenger seats. A multi-speed transmission is operatively affixed to the rear or output portion of the engine at a location substantially behind the driver's seat. A remote control shifting mechanism is therefore utilized to affect a shifting of the transmission gears. The gear shift lever normally used in these heavy duty trucks projects upward from the floor of the driver's compartment between the driver's seat and the engine cover. Shift levers of this type are conventionally pivotable in a forward and backward direction and in a sideways or lateral direction. A lateral pivoting of the shift lever affectuates a selecting of the aligned shift forks of the associated transmission while a forward or backward pivoting drives a selected shift fork backward or forward, thereby selectively engaging or disengaging the gears associated with the shift fork.

The space problems in the driver's compartment become more evident as the number of gears in the transmission increases. More lateral pivoting of the shift lever is required as more shift forks are used in the transmission. Obstruction of lateral movement of the shift lever by the driver seat or the engine cover becomes an increasing possibility.

In other types of vehicles, such as smaller trucks or passenger cars, the transmission is located directly under the driver's compartment and a remote control shift mechanism is not required. The shift lever may extend from a direct control shift mechanism mounted on the transmission or may extend directly from the shift forks within the transmission. However, in either situation, sideways or lateral pivoting of the shift lever has heretofore been required to select one of a plurality of shift forks within the associated transmission. Seats or other equipment within the driver's compartment may obstruct or interfere with the lateral or side movement of the shift lever.

SUMMARY OF THE INVENTION

According to the invention there is provided a shift mechanism for the gears of a transmission comprising a pivotally mounted bushing assembly. The bushing assembly defining an aperture. Positioned in adjacent spaced apart relationship to the bushing assembly is means for selectively engaging one of a plurality of gears in a transmission. A shift lever is rotatably positioned in the aperture in the bushing assembly. The shift lever is free to pivot with the bushing assembly. One end of the shift lever is adapted for drivingly engaging the means for selectively engaging one of a plurality of gears in a transmission, whereby rotating the shift lever selects the gear in the transmission and pivoting the shift lever engages the selected gear in the transmission.

It is an object of the present invention to reduce the lateral shift lever movement required for the operation of a multi-speed transmission.

Other objects and advantages of the invention will become apparent as the invention is described hereinafter in more detail with reference to the accompanying drawings.

DESCRIPTION OF THE PREFERRED EMBODIMENTS

The present invention relates to a shift mechanism for selectively engaging one of a plurality of gears in a transmission. The details of this invention will be more readily understood by referring to the attached drawings in connection with the following description.

Figures 1, 4:
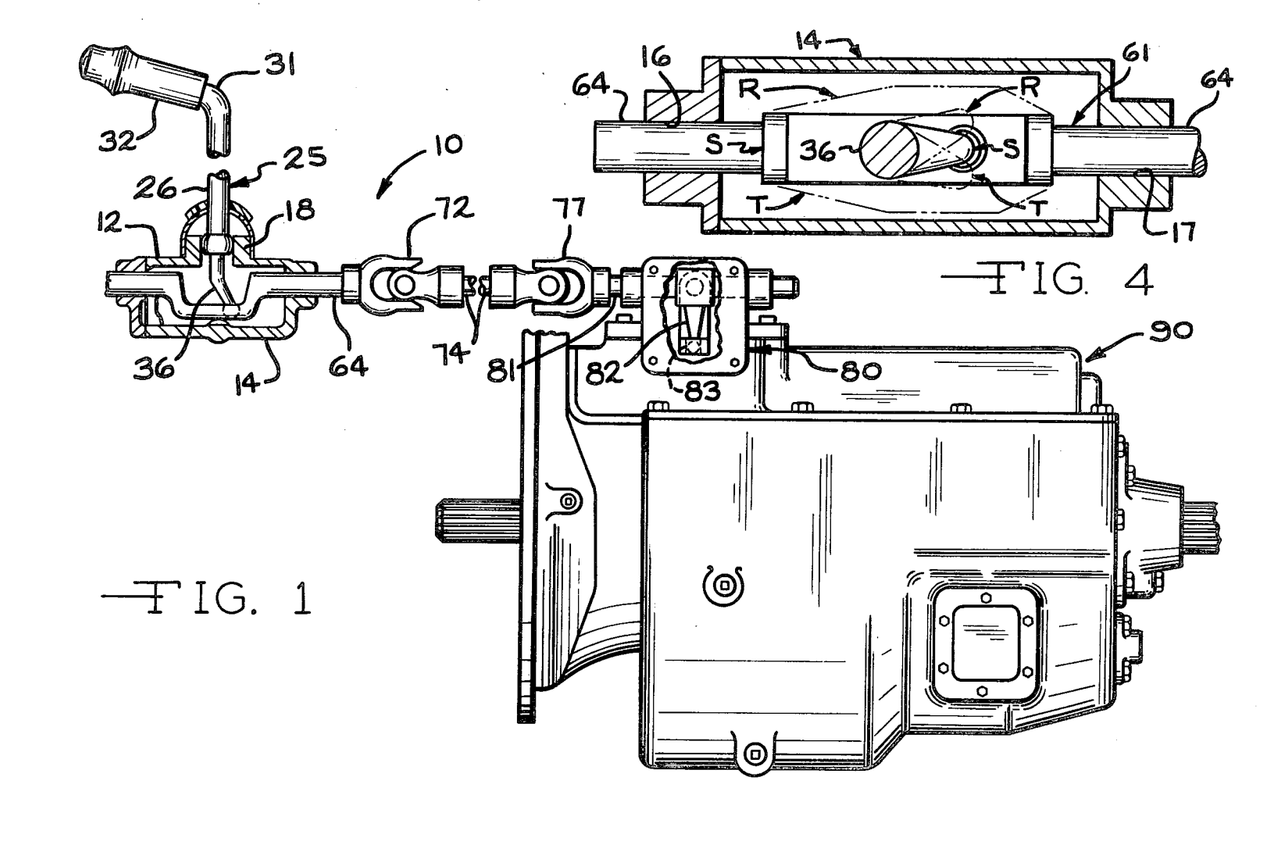
FIG. 1 is a side view of a shift mechanism of the present invention adapted for use with a remote control shifting unit.
FIG. 4 is a cross sectional plan view of the shift mechanism of FIG. 2.

In FIG. 1 a shift lever assembly 10 is operatively associated with a synchronized transmission 90 for a heavy duty vehicle, such as a truck. The assembly 10 includes a remote control unit 80 mounted on the transmission 90 and an independent control unit 12 mounted adjacent to the operator or passenger compartment of the vehicle. The remote and independent control units are mechanically linked as will hereinafter be described.

Figure 2:
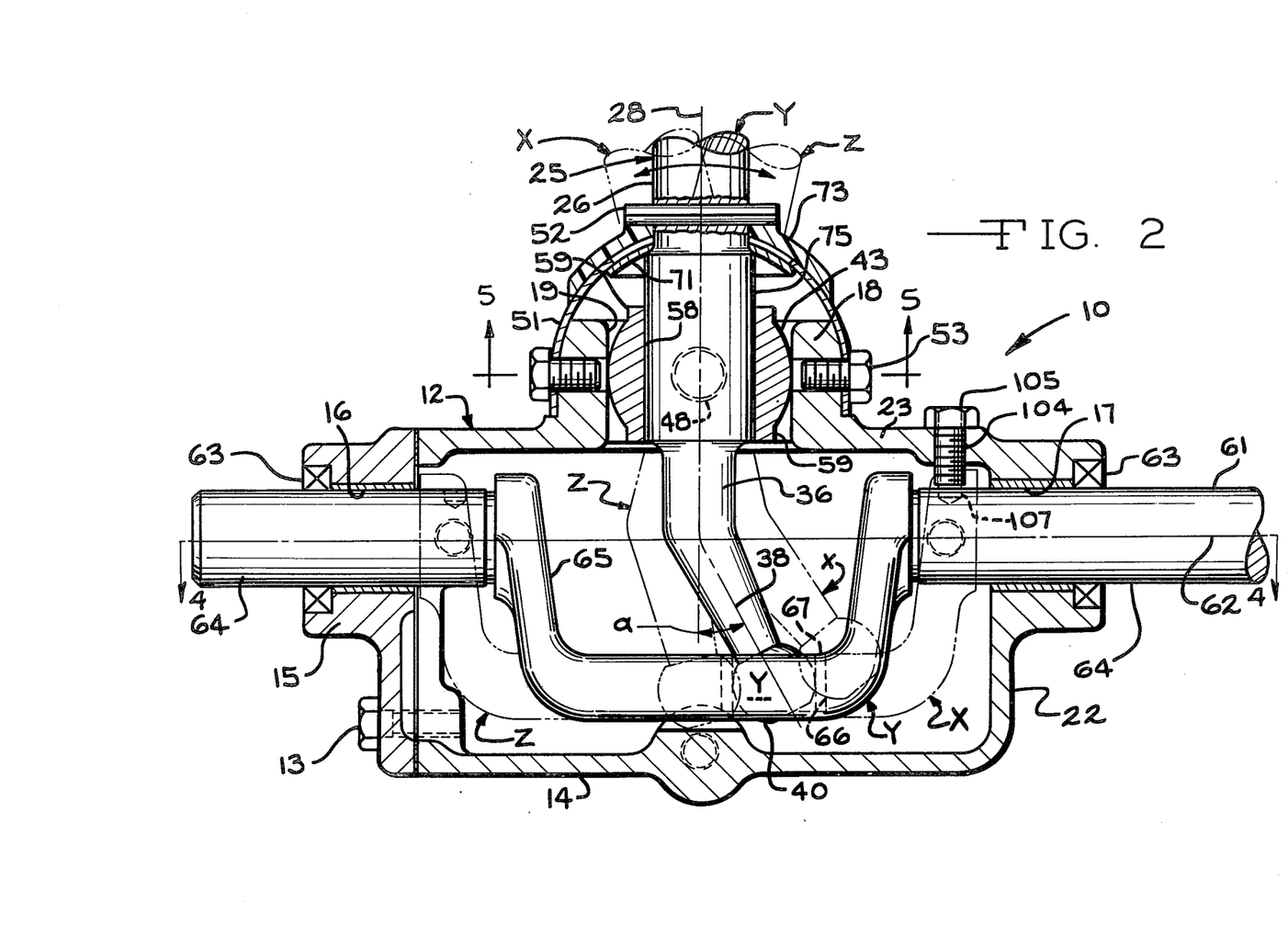
FIG. 2 is an enlarged cross sectional view of a portion of the shift mechanism of FIG. 1.

As can be more clearly seen in FIG. 2 the independent control unit 12 has an enclosure 14 which includes a rear wall 22 and a top wall 23. A front cover place 15 is secured to the housing 14 by means of bolts 13. The front plate has a cylindrical bore 16 adapted to partially contain independent control shift bracket 61 as will hereinafter be described. The rear wall 22 contains a cylindrical bore 17 of the same diameter as and axially aligned with the bore 16. The top wall 23 of the housing 14 has an upwardly extending lug or flange 18 having a port or cylindrical bore 19 extending therethrough.

The shift lever 25 comprises a main shaft 26 having a generally longitudinally extending main shaft axis 28 about which it is rotatable. The main shaft 26 may extend out of the direct control unit 12 from about 10 to about 40 inches, depending on the type of vehicle with which it is used, the height of the driver's seat, etc. Rigidly attached to the upper end of the main shaft 26 is a handle 31 for rotating and pivoting the shift lever 25. The handle 31 is illustrated in FIG. 1 as an integral rearwardly bended extension of the main shaft 26, having a rubber or plastic grip 32. The handle 31 facilitates rotation of the shift lever 25 and readily indicates the angles at which the lever 25 disposed. However, other types of handles, such a spherical knob or a "T" handle, which may incorporate means for determining the angle at which the lever 25 is disposed, may also be utilized with the shift lever of the present invention.

Referring now to FIG. 2, integral with and disposed at the lower end of the main shaft 26 is a rigid offset shaft or finger 36 which forms a shift bracket engaging means. The offset shaft 36 has a generally longitudinal axis 38 which extends at an angle "a" relative to the main shaft axis 28. The offset shaft 36 in the embodiment of FIG. 1 is curved, but it is understood that a straight shaft may also be utilized in the present invention. Integral with and disposed at the lower end of the offset shaft 36 is a truncated spherical member 40 for drivingly engaging the shift bracket 61. The spherical shape of the member 40 is preferred to facilitate relative pivotal movement between the member 40 and the bracket 61 as a shift lever 25 is rotated and/or pivoted.

A spherical bushing assembly 43 is positioned in the cylindrical bore 19 located in the flange 18 in the top wall 23 of the housing 14. The spherical bushing assembly contains or defines an aperture 58 that passes substantially through the center of the bushing assembly. The diameter of the aperture is substantially equal to the diameter of the shift lever 25. The spherical bushing assembly 43 is supported in the cylindrical bore 19 by pivot pins 48. The pivot pins 48 have substantially aligned longitudinal axes that are substantially perpendicular to the longitudinal axis of the shift lever 25. The spherical bushing assembly 43 is supported on the pivot pins 48 so that the spherical bushing assembly is free to pivot within the elongated bore 19. The outer surfaces of the cylindrical bushing assembly 43 that are in communication with the cylindrical bore 19 are generally curved and allow the spherical bushing assembly to pivot within the bore 19. However, the upper and lower surfaces of the spherical bushing assembly are truncated and contain shoulder regions 59.

The shift lever 25 is rotatably positioned in the aperture 58 in the spherical bushing assembly 43. The shift lever 25 contains an enlarged diameter section 75 that is positioned in the aperture 58. The diameters of the aperture 58 and the enlarged diameter section 75 are selected so that the shift lever is free to rotate about its longitudinal axis when positioned in the aperture 58. The shift lever is also free to pivot with the spherical bushing assembly 43 about the axes of the pivot pins 48. Pivoting of the bushing assembly results in a generally fore and aft movement of the shift lever 25.

Figures 5, 6:
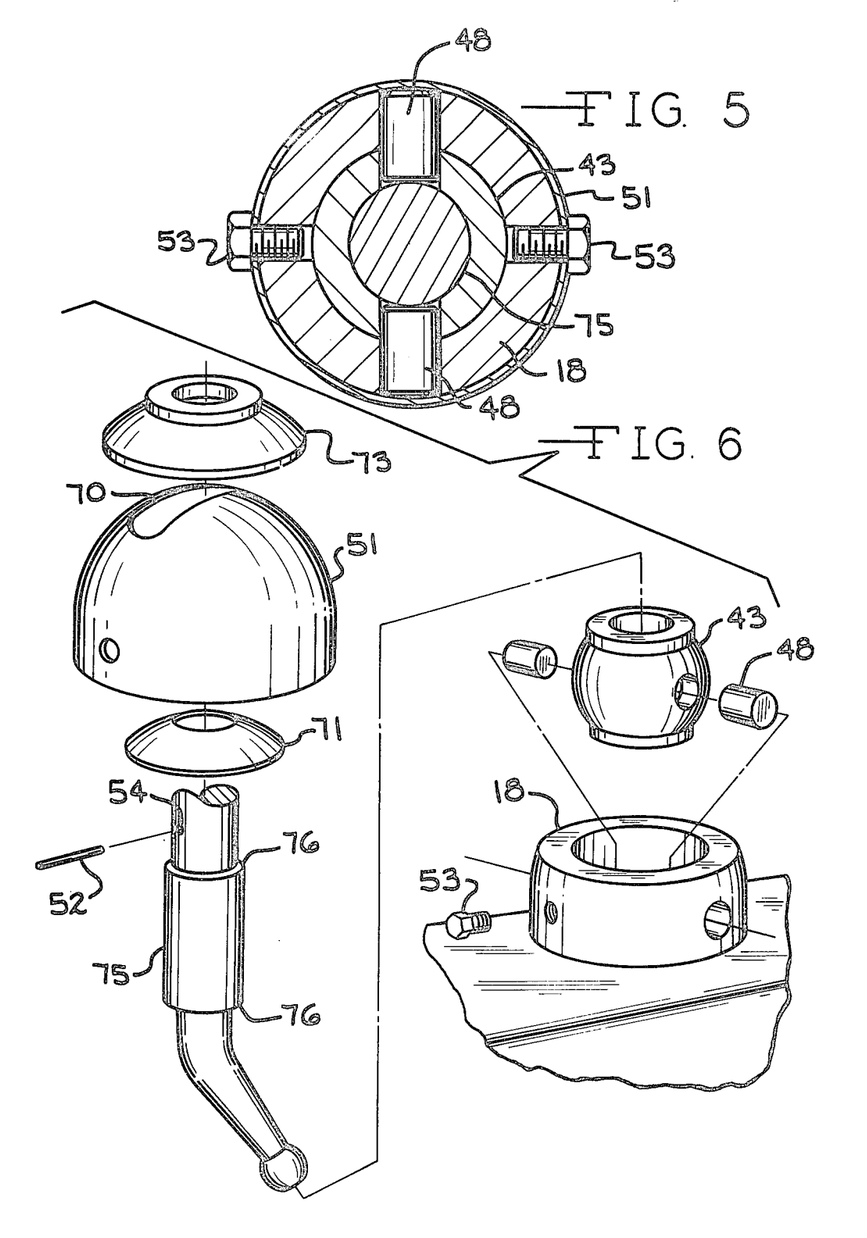
FIG. 5 is a cross sectional plan view of the bushing assembly of FIG. 2.
FIG. 6 is a perspective view of the shift lever assembly and bushing assembly of FIG. 2.

An inverted cup or cover 51 for containing grease or other lubricants within the bushing assembly is fitted over the flange 18. The cup 51 is secured to the flange 18 by bolts 53 or any other suitable securement means. As can best be seen in FIG. 6, the cup 51 contains an elongated slot 70. The shift lever 25 is positioned in the elongated slot 70. The elongated slot allows the shift lever to pivot in a fore and aft direction without interference from the cup 51. Positioned in the interior of the cup 51 is a first washer 71 defining an aperture. The aperture in the first washer is substantially the same diameter as the diameter of the shift lever 25. The shift lever 25 is positioned in the aperture in the first washer 71. A second washer 73 defining an aperture is positioned on the exterior of the cup 51. The aperture is positioned on the exterior of the cup 51. The aperture in the second washer is substantially the same diameter as the diameter of the shift lever 25. The shift lever is positioned in the aperture in the second washer 73.

The shift lever 25 contains an enlarged diameter section 75 that is positioned in the bushing assembly 43. The large diameter section 75 terminates in a ridge or flange 76 on both sides of the bushing assembly 43. The flange 76 on the shift lever 25 is positioned in abutting relationship with the first washer 71 that is positioned on the interior of the cup 51. A spring pin 52 is positioned in an aperture 54 in the shift lever 25 in abutting relationship with the second washer 73. The spring pin securely positions the flange 76 against the first washer, the cup and the second washer. In this position the first and second washers will move with the shift lever 25 and seal the elongated slot 70 located in the cup 51. The cup 51 is secured to the flange 18 on the housing of the shift mechanism. The flange 76 is securely positioned against the interior of the cup 51 and the spring pin 52 is securely positioned against the exterior of the cup 51. Accordingly, the shift lever 25 will not be able to move relative to the cup in a direction that is parallel to the longitudinal axis of the shift lever 25. The cup 51, therefore, provides the support that presents the shift lever from moving in a direction that is parallel to the longitudinal axis of the shift lever.

The cup 51 also seals the exterior openings of the apertures in which the pivot pins are located. The shift lever 25 seals the interior openings of the apertures in which the pivot pins are located. Thus, the cup 51 and shift lever 25, when in position the shift mechanism, act to secure the pivot pins in the bushing assembly 43 and flange 18.

A bracket 61 having a generally longitudinal axis 62 extends to the independent control unit 12. Each end portion 64 of the bracket 61 extends through a bore 16 or 17 in the unit 12. Each bore 16 and 17 contains an oil seal 63 for sealingly engaging the bracket 61 while permitting both axial and rotational movement with respect thereto. Intermediate the end portions 64 of the bracket and rigidly affixed thereto is an offset portion 65 which is radially spaced from the axis 62 of the bracket. The offset portion 65 is a generally "U" shaped member affixed to the end portions 64. The offset portion 65 contains a cylindrical aperture 66 which is fitted with a hardened cylindrical bushing 67. The inside diameter of the bushing 67 is such as to snuggly fit about the bracket engaging sphere 40 of the offset shaft 36. The sphere 40 extends into the opening 66 and bushing 67 and is in a driving pivotal engagement therewith.

Referring again to FIG. 1, a universal joint 72 is attached to the rearward end portion 64 of the bracket 61 in a manner well known in the art. Similarly the other end of the joint 72 is secured to one end of a shaft or linkage 74 which extends between the independent control unit 12 and the remote control unit 80. A second universal joint 77 links the other end of the shaft 74 to an outer shaft 81 which extends through the remote control unit 80. Universal joints such as 72 and 77 are utilized in the shift assembly because the shift bracket 61 and the outer shaft 81 most often do not lie on a common axis. Depending on the particular vehicle involved, additional shafts or linkages, such as 74, may be included in the shifting assembly 10.

Figure 3:
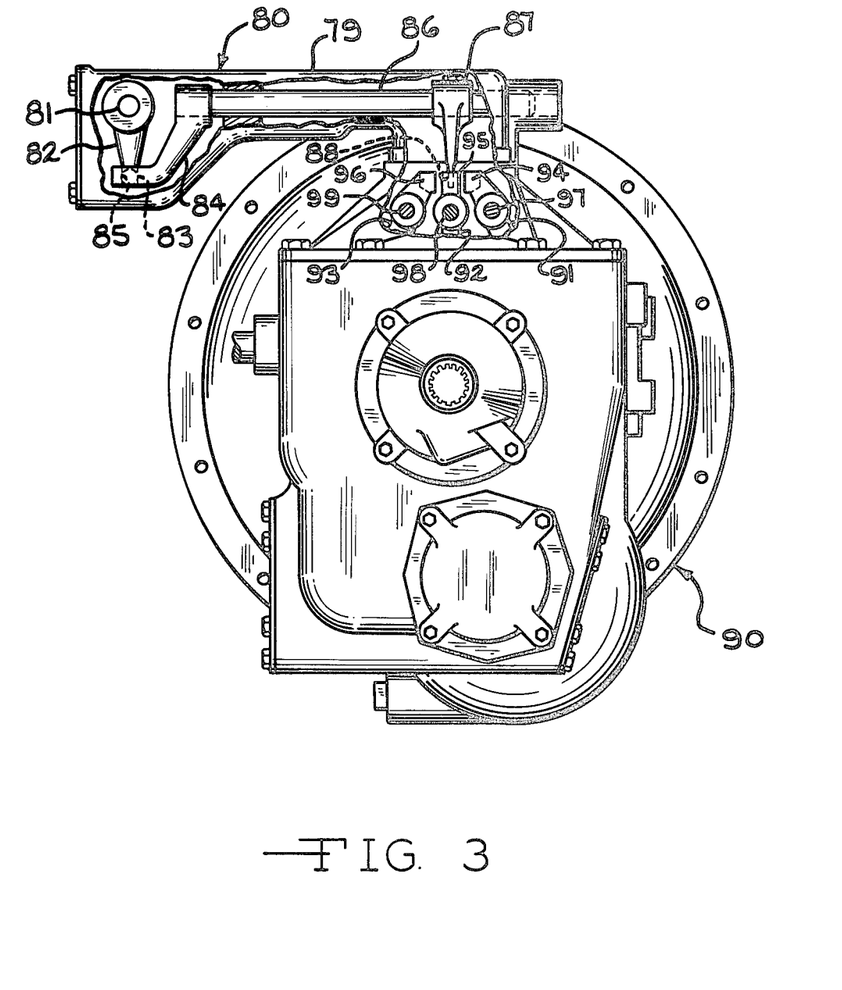
FIG. 3 is an end view of the multi-speed transmission of FIG. 1 partly cut-away for clarity.

As is more clearly seen in FIG. 3 the remote control unit 80 comprises a housing or cover 79 which is mounted on the top of the multi-speed synchronized transmission 90. The outer shaft 81 passes through the housing 79 at a location laterally spaced from the center of the transmission 90. Rigidly affixed to the outer shaft 81 is an outer shift finger 82 which extends downward and terminates in a spherical bracket contact member 83.

The outer shift finger 82 is adapted to rotatably and laterally drive a cross shaft bracket 84. The bracket 84 is rigidly attached to one end of the cross shaft 86 which extends through the housing 79 in a direction transverse to the axis of the outer shaft 81. The bracket 84 extends generally downward and outward from the cross shaft 81 and accepts the bracket contact member 83 in an aperture 85.

A shift finger 87 is affixed to the cross shaft 86 at a location above a center portion of the transmission. Similar to the outer shift finger 82, the shift finger 87 extends downwardly and terminates in a shift fork engaging lug 88. The lug 88 is adapted to selectively engage three lugs 94, 95, and 96, each of which extend upwardly from a shift fork 91, 92, 93, respectively. Each of the three shift forks 91, 92, 93 ride on a shift rod 97, 98, or 99 respectively, which extends the length of the transmission 90. The shift fork 91, 92, and 93 are adapted to axially drive selected gears of the transmission to affect an engagement or disengagement thereof.

The shift forks 91, 92, and 93 each have a fore and aft position, with each position corresponding to engagement of a different transmission gear. A positioning of the shift forks intermediate the fore and aft positions corresponds to a neutral position of the associated gears. Shift fork 91 engages the low or first gear and the reverse gear in the fore and aft positions, respectively. Similarly shift forks 92 and 93 engage the second and third gears, and fourth and fifth gears, in the aft and fore positions, respectively. A description of the internal components of the transmission and the mechanics of synchronization and shifting of the gears will not be set forth herein as they are well known in the art.

The top wall 23 of the housing 14 also contains a set screw 104 and jam nut 105. The set screw 104 extends through a threaded aperture located on the top wall 23 into the interior of the housing 14. The set screw is position to align with a bore 107 in the shift bracket 61 when the shift bracket is in the neutral position the jam nut 105 is positioned on the portion of the set screw that projects from the exterior of the housing 14. The jam nut 105 is tightened.

For a more thorough understanding of the present invention a description of the operation of the previously described embodiment is set forth. The directions forward, rearward, leftward and rightward are given in this description with respect to a person sitting in the driver's seat of a vehicle utilizing the remote control shifting unit. Clockwise and counterclockwise directions are given with respect to the shaft 36 as seen in FIG. 4, unless otherwise noted.

First gear of the transmission 90 is usually engaged when the vehicle is started from a dead stop. When first gear is engaged, the shift lever 25 is rotatively positioned in its extreme counterclockwise position, with the offset shaft 36 and the offset portion 65 of the bracket 61 thereby in their respective first shift fork engaging positions R. The shift bracket 61, linkage 74, outer shaft 81 and the outer shaft finger 82 are all accordingly rotatively positioned. The outer shift finger 82, outer shift bracket 84, cross shaft 86 and shift finger 87 are all at their rightward most positions. The shift finger lug 88 is therefore adapted for engagement with the lug 94 of the first shift fork 91.

Furthermore, referring to FIG. 2, in first gear the main shaft 26 is pivoted in the spherical bushing assembly 43 to position Z and the offset shaft 36 is pivoted to its forward most position Z. The bracket 61 is thereby also in its forward most position Z, along with the linkage 74, outer shaft 81, and outer shift finger 82. The outer shift bracket 84, cross shaft 86 and shift finger 87 are thereby rotated to their forward most positions. The first shift fork 91 is therefore in its fore position, which corresponds to an engagement of first or low gear.

To shift from first gear to second gear, the operator must first disengage first gear by pivoting the main shaft 26 in the spherical bushing assembly 43 from the first gear engagement position 1 to a neutral position Y. It should be noted that the relationship between the bushing assembly 43 and the main shaft 26 permits pivoting of the shift lever notwithstanding any clockwise or counterclockwise position of the lever. Forward pivoting of the main shaft 26 from its position Z to Y causes a generally rearward pivoting of the offset shaft 36 from position Z to a neutral position Y and rearward movement of the bracket 71 to its neutral position Y. The linkage 74 is driven rearwardly thereby also driving the outer shift finger 82 rearwardly and rotating the cross shaft bracket 84, the cross shaft 86 and the shift finger 87 to their respective neutral positions. The shift fork 91 is driven rearwardly by the shift finger lug 88 along with the shift rod 97, disengaging the first or low gear.

The shift lever 25 is then rotated counterclockwise, with the main shaft 26 rotating about its axis 28. Rotation of the main shaft 26 causes rotation of the offset shaft 36, with the bracket engaging means 40 and the bracket offset portion 65 moving in an acurate path from their respective first shift fork engaging positions R to their second shift fork engaging positions S. The bracket engaging means 40 drivingly rotates the offset portion 65, thereby rotating the bracket 61 about its axis 62. This rotation is transmitted by the linkage assembly to the remote control unit 80 which converts the rotation into linear motion. Rotation of the outer shift finger 82 drives the cross shaft bracket 84 and the cross shaft leftwardly until the shift finger 87 is aligned with the lug 95 on the second shift fork 92.

After this rotation of the shift lever 25, the operator engages the second gear by pivoting the main shaft 26 forwardly to its position X along the same path or in the same plane as in disengaging the first gear, thereby pivoting the offset shaft 36 and the shift bracket 61 to their rearward positions X. This rearward motion will be transmitted to the remote control unit, ultimately rotating the shift finger 87 to its rearwardmost or aft position, pushing the second shift fork 92 rearwardly and engaging second gear.

Rotation of the shift lever is not required in shifting from second to third gear because both of these gears are driven by the second shift fork 92. A single motion pivoting of the main shaft 26 in the pivot plane from the forward position X to the rearward position Z will disengage second gear and engage third gear by moving the second shift fork 92 forwardly. As is apparent, a shift from third gear to fourth gear and then to fifth gear may be accomplished by continual selective rotation of the shift lever 25 and by pivoting of the shift lever within a single plane.

During the operation of the shift mechanism the shift lever 25 is free to rotate about its longitudinal axis within the aperture 58 of the spherical bushing assembly 43. The shift lever can be rotated to as many gear engaging positions as required by the multi-speed transmission to which the shift lever is operatively attached. Accordingly, the shift mechanism of the present invention can be adapted for use with transmissions having different numbers of gear engaging positions without significant modification to the shift mechanism. The aperture 58 normally provides a low friction surface that facilitates the rotation of the shift lever 25 within the aperture 58. The low friction relationship between the aperture 58 and shift lever 25 reduces the effort required to shift the gears of the transmission. The aperture 58 can also be covered or adapted with a low friction material to further reduce the resistance to rotation of the shift lever 25.

The shift lever 25 can be easily removed from the shift mechanism. The shift lever is held in place by the cup 51 and spring pin 52. To remove the lever the bolts 53 holding the cup on flange 18 must be removed. Once bolts 53 are removed the shift lever 25, spring pin 52, cup 51, first washer 71 and second washer 73 can all be removed from the shift mechanism. The spring pin 52 can then be removed from the shift lever to allow the cup 51, first washer 71 and second washer 73 to be removed from the shift lever 25. The shift lever can be replaced in the shift mechanism by reversing the above operations.

In some operations, such as during the assembly of a vehicle, it is desirable to lock the shift mechanism in a neutral position. In the present invention this can be accomplished by positioning the shift lever in the neutral position and advancing the set screw 104 into the interior of the housing 14. The jam nut 105 must be loosened so that the set screw can be advanced into the interior of the housing. The set screw 104 is advanced until it engages bore 107 in the shift bracket 61. The jam nut 105 is then advanced until it engages the outer housing to secure the set screw in the bore 107. The engagement of the set screw with the bore 107 will prevent the shift bracket from moving and will, therefore, lock the shift mechanism in the neutral position. Since the set screw 104 only aligns with the bore 107 when the shift bracket 61 is in the neutral position the shift mechanism can only be locked in the neutral position. To unlock the shift mechanism the jam nut 105 is loosend and the set screw 104 is disengaged from the bore 107 in the shift bracket 61.

Figure 7:
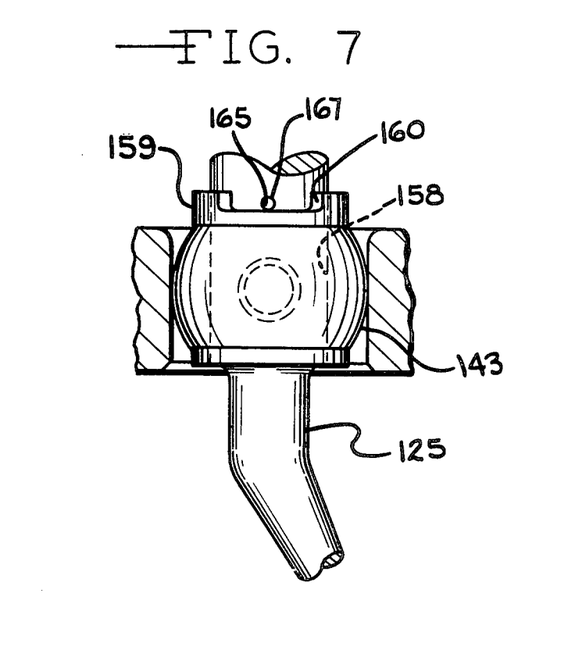
FIG. 7 is a cross sectional side elevation view of another embodiment of the invention.
Figure 8:
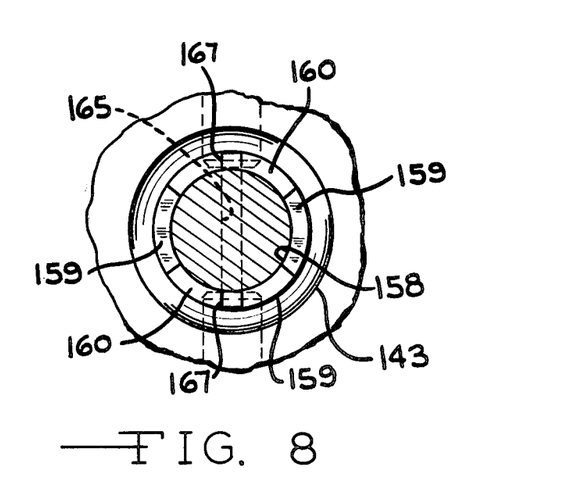
FIG. 8 is a plan cross sectional view of the embodiment shown in FIG. 7.

FIGS. 7 and 8 show another embodiment of a spherical bushing assembly that can be utilized in the present invention. In this embodiment, the bushing assembly is pivotally positioned in the shift mechanism as previously described.

In FIGS. 7 and 8 there is a bushing assembly 143 that is pivotally positioned in the shift mechanism. The bushing assembly defines an aperture 158 that passes through substantially the center of the bushing assembly. On one end of the bushing assembly, adjacent the aperture 158, there is an extended shoulder region 159. Two notches 160 of substantially the same width are positioned in the shoulder region 159. The two notches 160 are substantially in alignment on the shoulder region. A shift lever 125 is positioned in the aperture 158. The shift lever defines or contains an aperture 165 and the aperture 165 is substantially in alignment with the notches 160. A rod or spring pin 167 is positioned in the aperture 165 in the shift lever. The spring pin extends from both sides of the shift lever 125. The ends of the spring pin extend from the shift lever, a distance that is sufficient to allow the spring pin to engage the sidewalls of the notch 160.

The operation of the bushing assembly 143 is substantially as previously described. The shift lever 125 is rotated within the bushing assembly 143 to select a particular gear in the associated transmission (not shown) and the shift lever and bushing assembly are pivoted to engage the selected gear. However, in this embodiment the rotation of the shift lever is restricted. The spring pin 167, positioned in the shift lever, is only free to rotate within the opening defined by the two notches 160. If the shift lever is rotated too far the spring pin will engage the sidewalls of the notches and prevent the shift lever from rotating further. Thus, the spring pin 167 and notches 160 cooperate to limit the rotational movement of the shift lever 125.

Normally, the spring pin 167 will be substantially in the center of the two notches 160 when the shift lever 125 is in the neutral position. As the shift lever is rotated to select different gears the spring pin will rotate and move towards the sidewalls of the notches. The notches are of sufficient width to allow the shift lever to rotate to all of the gear selection positions without the spring pin 167 engaging the sidewalls of the notches. Normally, the spring pin will be adjacent but not touching the sidewalls of the notches 160 when the shift lever is rotated to furthest gear selection position. However if the shift lever is rotated beyond the furthest gear selection position the spring pin will engage the sidewalls of the notches and prevent further rotation of the shift lever. Thus, the spring pin and notches cooperate to prevent the shift lever from being rotated beyond its operational range. The spring pin and notches also prevent the shift mechanism from being broken or damaged from improper shifting.

The above described embodiments of the present invention as illustrated in FIGS. 1 through 8 are specifically adaptable to a transmission utilizing a remote control shifting unit. However, there are many applications of the present invention in which the shift lever may be disposed adjacent the associated transmission. It should be noted that the shift mechanism of the present invention can be disposed adjacent the associated transmission without departing from the scope of the present invention.

Having described the invention in detail and with reference to the drawings, it will be understood that such specifications are given for the sake of explanation.

Various modifications and substitutions other than those cited can be made without departing from the scope of the invention as defined by the following claims.

I claim:

1. A shift mechanism for the gears of a transmission comprising:
    a pivotally mounted bushing assembly, said bushing assembly defining an aperture;
    means for selectively engaging one of a plurality of gears in a transmission positioned in adjacent, spaced apart relationship to said bushing assembly; and
    a shift lever rotatably positioned in said aperture, said shift lever being free to pivot with said bushing assembly, one end of said shift lever adapted for drivingly engaging said means for selectively engaging one of a plurality of gears in a transmission, whereby rotating said shift lever selects said gear in said transmission and pivoting said shift lever engages said selected gear in said transmission.

2. The shift mechanism of claim 1 wherein said bushing assembly is spherical in shape.

3. The shift mechanism of claim 2 wherein the bushing assembly is pivotally positioned in a stationary housing.

4. The shift mechanism of claim 3 wherein said bushing assembly is rotatably positioned in a cylindrical bore in said stationary housing.

5. The shift mechanism of claim 3 wherein said spherical bushing assembly contains shoulder regions, said shoulder regions engageable with said stationary housing to limit the range of pivotable movement of said bushing assembly.

6. The shift mechanism of claim 1 wherein said bushing assembly is pivotally mounted on at least one pivot pin.

7. The shift mechanism of claim 6 wherein the longitudinal axis of the pivot pin is substantially perpendicular to the longitudinal axis of the shift lever.

8. The shift mechanism of claim 1 wherein said means for selectively engaging one of a plurality of gears in a transmission includes means for releasably locking said transmission in neutral.

9. The shift mechanism of claim 8 wherein said means for releasably locking said transmission in neutral is a set screw.

10. The shift mechanism of claim 1 wherein said shift lever is held in position in said bushing assembly by a spring pin.

11. The shift mechanism of claim 5 wherein at least one of said shoulder regions contain a notch adjacent said aperture in said bushing.

12. The shift mechanism of claim 11 wherein said shift lever defines an aperture, said aperture being substantially in alignment with said notch of said bushing assembly.

13. The shift mechanism of claim 12 wherein a spring pin is positioned in said aperture in said shift lever, said spring pin extending from said aperture and being engagable with said notch in said bushing assembly, said spring pin and said notch thereby cooperating to limit the rotation of said shift lever.

14. A shift mechanism for the gears of a transmission comprising:
    an outer housing defining a cylindrical bore;
    at least one pivot pin positioned in said cylindrical bore of said outer housing;
    a spherical bushing assembly pivotally mounted in said cylindrical bore on said pivot pin, said bushing assembly defining an aperture;
    means for selectively engaging one of a plurality of gears in a transmission positioned in adjacent, spaced apart relationship to said bushing assembly; and
    a shift lever rotatably positioned in said aperture, said shift lever being free to pivot with said bushing assembly, one end of said shift lever extending from said outer housing, said other end of said shift lever adapted for drivingly engaging said means for selectively engaging one of a plurality of gears in a transmission, whereby rotating said shift lever selects said gear in said transmission and pivoting said shift lever engages said selected gear in said transmission.

* * * * *